(12) United States Patent
Fey

(10) Patent No.: US 9,222,852 B2
(45) Date of Patent: Dec. 29, 2015

(54) METHOD FOR DETECTING THE OPERATIONAL READINESS OF A JUMP LAMBDA SENSOR

(75) Inventor: Michael Fey, Wiernsheim (DE)

(73) Assignee: Robert Bosch GmbH, Stuttgart (DE)

(*) Notice: Subject to any disclaimer, the term of this patent is extended or adjusted under 35 U.S.C. 154(b) by 319 days.

(21) Appl. No.: 13/995,020

(22) PCT Filed: Nov. 23, 2011

(86) PCT No.: PCT/EP2011/070787
§ 371 (c)(1),
(2), (4) Date: Jun. 17, 2013

(87) PCT Pub. No.: WO2012/079934
PCT Pub. Date: Jun. 21, 2012

(65) Prior Publication Data
US 2013/0263652 A1 Oct. 10, 2013

(30) Foreign Application Priority Data

Dec. 15, 2010 (DE) .......................... 10 2010 063 117

(51) Int. Cl.
*G01M 15/10* (2006.01)
*F02D 41/14* (2006.01)

(52) U.S. Cl.
CPC .......... *G01M 15/104* (2013.01); *F02D 41/1496* (2013.01); *F02D 41/1455* (2013.01)

(58) Field of Classification Search
CPC . Y02T 10/47; F02D 41/1493; F02D 41/1496; G01M 15/104

USPC .................. 73/1.06, 114.71–114.73, 114.77; 701/103, 109
See application file for complete search history.

(56) References Cited

U.S. PATENT DOCUMENTS

| 4,167,163 | A | * | 9/1979 | Moder | 123/688 |
| 5,140,535 | A | * | 8/1992 | Raff et al. | 702/104 |
| 5,291,417 | A | * | 3/1994 | Schnaibel et al. | 700/300 |
| 2010/0154525 | A1 | | 6/2010 | White et al. | |

FOREIGN PATENT DOCUMENTS

| DE | 19636226 | 3/1998 |
| DE | 102005005764 | 8/2006 |
| EP | 1637719 | 3/2006 |

OTHER PUBLICATIONS

International Search Report for Application No. PCT/EP2011/070787 dated Jan. 31, 2012 (2 pages).

* cited by examiner

*Primary Examiner* — Peter Macchiarolo
*Assistant Examiner* — Nathaniel Kolb
(74) *Attorney, Agent, or Firm* — Michael Best & Friedrich LLP

(57) ABSTRACT

In a method for detecting the operational readiness of a jump lambda sensor associated with an internal combustion engine the internal resistance of the sensor is determined as the criterion for the operational readiness of the sensor. The internal resistance is measured by applying a pulsed current to the sensor, the frequency of the current being selected as a function of the state of the sensor (1, 2, 3, 4).

18 Claims, 1 Drawing Sheet

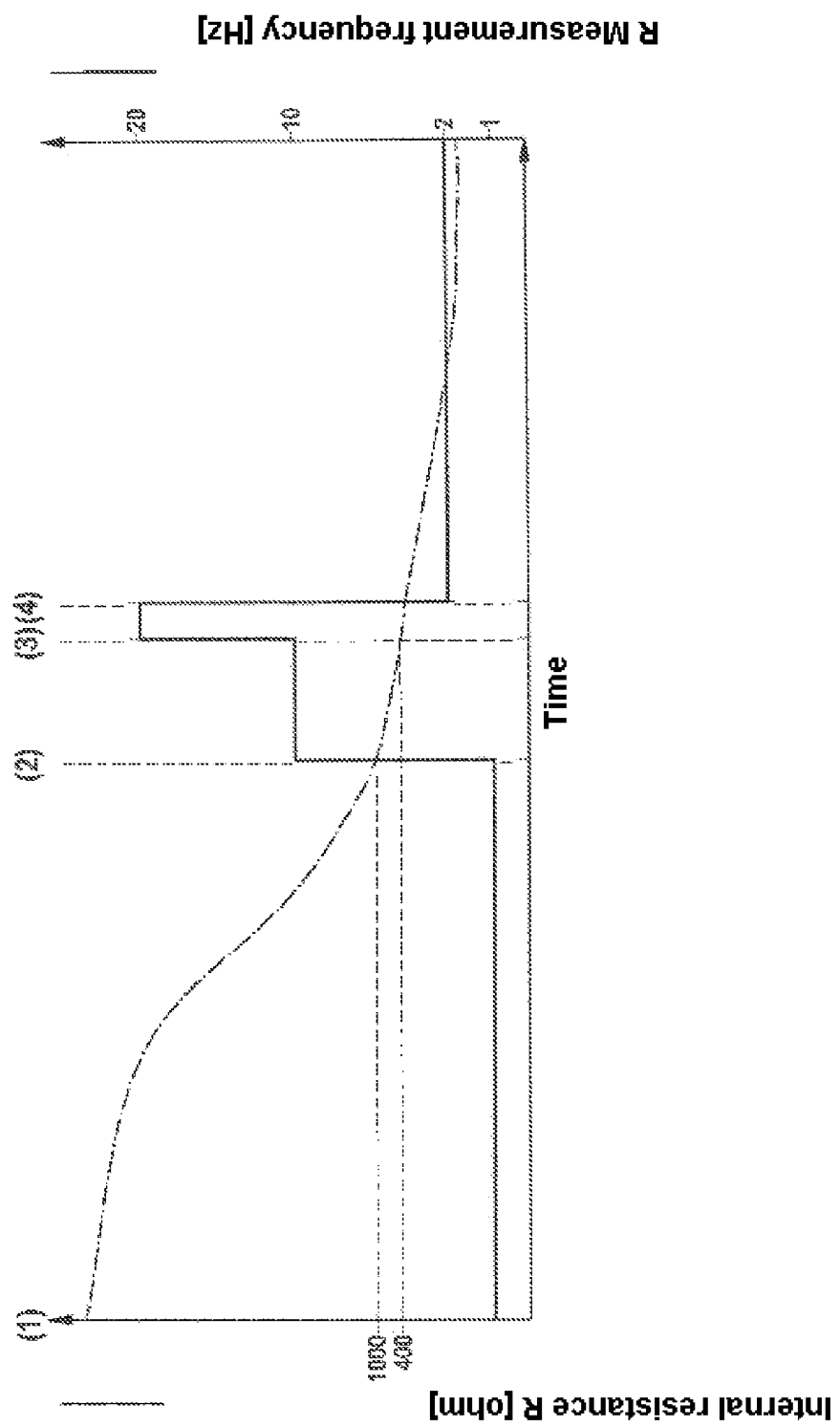

METHOD FOR DETECTING THE OPERATIONAL READINESS OF A JUMP LAMBDA SENSOR

BACKGROUND OF THE INVENTION

The present invention relates to a method for detecting the operational readiness of a jump lambda sensor, the internal resistance of the sensor being measured as the criterion for the operational readiness of the sensor.

THE STATE OF THE ART

In order to detect the concentration of oxygen in the exhaust gas of an internal combustion engine, lambda sensors are used in present-day engine control systems. The oxygen concentration in the exhaust gas of the internal combustion engine is determined by means of the lambda sensors, so that the supply of air and fuel to the internal combustion engine can be controlled via a lambda feedback control loop in such a way that an optimum composition of the exhaust gas can be attained for exhaust gas after-treatment by catalytic converters provided in the exhaust gas tract of the internal combustion engine.

Various forms of lambda sensors are known. In the case of a two-point lambda sensor, also referred to as a jump lambda sensor, the characteristic curve shows an abrupt drop at $\lambda=1$. In this case a jump sensor essentially allows a distinction to be made between rich exhaust gas when operating the internal combustion engine with excess fuel and lean exhaust gas when operating with excess air. A so-called wideband lambda sensor, which is also referred to as a continuous or linear lambda sensor, makes possible measurement of the lambda value in the exhaust gas within a wide range around $\lambda=1$. A wideband lambda sensor can therefore also be used, for example, for adjusting the internal combustion engine to lean operation with excess air.

In general, a lambda sensor is based on a galvanic oxygen concentration cell having a solid electrolyte. The solid electrolyte has the property of being able to transport oxygen ions electrolytically at high temperature, whereby a voltage is produced. By virtue of this property the difference between the oxygen partial pressure of two different gases, in particular of the exhaust gas stream and of an oxygen reference gas, can be determined. The solid electrolyte typically becomes conductive for oxygen ions at an activation temperature of approximately 350° C. As a rule, the nominal temperature of the sensor is significantly higher, typically between 650° C. and 850° C. However, the lambda sensor is also operationally ready, and meets the requirements of the engine control system, below the nominal temperature. The temperature at which the lambda sensor becomes operationally ready therefore lies between the activation temperature and the nominal temperature of the sensor.

As soon as the sensor is operationally ready, the sensor signal can be used for control and diagnostic purposes. Above all, the lambda control can only be activated with a sensor that is operationally ready. Because an active lambda control is of decisive importance in reducing the harmful emissions in the exhaust gas of the internal combustion engine, the operational readiness of the lambda sensor should be reached as rapidly as possible after the engine has been started. Furthermore, the operational readiness of the lambda sensor should also be detected as quickly as possible.

In general, the criterion for detecting a lambda sensor which is operationally ready is the exceeding of a given temperature threshold of the sensor. As soon as the sensor is hot enough, operational readiness is present.

In the case of wideband lambda sensors, as a rule the ceramic temperature is measured in order to detect operational readiness. As soon as the ceramic temperature exceeds a predefinable threshold, it can be concluded that the sensor is operationally ready. Measurement of the ceramic temperature can be carried out by direct or indirect measurement. For example, the temperature of the sensor can be inferred indirectly by measuring the internal resistance of the sensor. After the internal resistance of the sensor has been measured, the measurement value is recalculated as the corresponding ceramic temperature using a single-valued characteristic curve. Measurement of the internal resistance can be effected by means of a high frequency alternating current, for example of 3 kHz, upon starting the engine, without the sensor signal being influenced to an impermissible degree thereby. In the case of wideband lambda sensors, therefore, detection of operational readiness of the sensor is possible practically without delay.

In the case of jump lambda sensors, the ceramic temperature is generally not available as a measurement value. Furthermore a jump lambda sensor is usually equipped with simpler electrical wiring which does not permit measurement of the internal resistance by high frequency alternating current upon starting the engine. For this reason the internal resistance of jump lambda sensors is usually measured by applying a pulse-shaped current to the sensor. The ceramic temperature is inferred from the internal resistance measured in this way, in particular with reference to an appropriate characteristic curve. However, the pulse-shaped current for measuring the internal resistance leads to distortion of the sensor signal through the accompanying polarization of the sensor. This polarization induces a voltage on the sensor which is higher than would be expected on the basis of the exhaust gas lambda. The polarization has a particularly strong effect when the sensor is cold and also decays only slowly with a cold sensor. If the polarization has not decayed completely by the occurrence of next load pulse, further build-up of the sensor voltage can occur, so that the sensor signal is no longer usable. The internal resistance of a jump lambda sensor is therefore generally measured only when the sensor is sufficiently hot, that is, generally only after the sensor has reached operational readiness. Internal resistance measurement by pulse-shaped current cannot therefore be used for actually detecting operational readiness.

Another indirect method for detecting operational readiness in the case of jump lambda sensors is known. In this case operational readiness of the sensor is detected when the sensor voltage leaves a defined rest position, the degree of deviation between the sensor voltage and a reverse voltage being determined as a measure for the temperature of the sensor. For this purpose a voltage source in the control unit of the internal combustion engine which generates a constant reverse voltage is used and connected in parallel to the sensor. The output voltage of the parallel circuit is measured and represents a superposition of the sensor voltage and the reverse voltage, the voltage of the voltage source with the lower internal resistance being predominant. A cold sensor has high internal resistance, so that the reverse voltage predominates. A hot sensor has low internal resistance, so that in this case the sensor voltage predominates. If the measurable voltage of the parallel circuit deviates from the reverse voltage, therefore, a hot sensor can be inferred. As soon as the deviation exceeds a predefinable threshold, therefore, operational readiness of the sensor can be detected. The advantage of this method is that this passive procedure does not influence the sensor voltage.

However, the sensor voltage is also dependent on the actual exhaust gas composition, so that this also has an influence on the degree of deviation between sensor voltage and reverse voltage. Depending on the exhaust gas lambda, therefore, the speed of detection of operational readiness of the sensor varies with this procedure, so that a delay in detecting operational readiness occurs, with a disadvantageous effect on the exhaust gas after-treatment through too-late activation of the lambda control. It is further disadvantageous in this case that a fault in the sensor can be misinterpreted as operational readiness of the sensor, since a deviation of the sensor voltage from the reverse voltage can also be caused by a sensor fault. To increase the robustness of this method, therefore, additional criteria permitting inferences about the operational readiness of the sensor are already being used, for example the heating status or the quantity of heat conducted to the sensor since starting of the engine. However, taking account of these additional criteria further delays detection of the operational readiness of the sensor, with the accompanying disadvantages for the exhaust gas after-treatment and the emissions produced.

It is therefore the object of the invention to provide an improved method for detecting the operational readiness of a jump lambda sensor. This method must detect the operational readiness of the jump lambda sensor reliably and rapidly without adversely influencing the sensor signal.

SUMMARY OF THE INVENTION

Advantages of the Invention

The method according to the invention for detecting the operational readiness of a jump lambda sensor utilizes a measurement of the internal resistance of the sensor as the criterion for operational readiness of the sensor. The internal resistance of a sensor depends directly on the temperature of the sensor ceramic and can therefore be used as a measure for the sensor temperature. Because the operational readiness of the sensor depends on the temperature of the solid electrolyte, the measurable internal resistance can be utilized as the criterion for operational readiness of the sensor. As the temperature increases, the internal resistance decreases. In particular, operational readiness of the sensor can therefore be detected if the internal resistance falls below a predefinable threshold. According to the invention, the internal resistance is measured by applying a pulsed current to the sensor, the frequency of the pulsed current being selected as a function of the state of the sensor. The pulsed current is not an alternating current in the sense that the current changes its direction or its polarity. Rather, it is a pulse-shaped current with a changeable frequency in which, for example, the switched-on times remain constant while the switched-off times are changed according to the state of the sensor. A higher frequency therefore means, in particular, shorter switched-off times with constant pulse duration, so that the pulses succeed one another at shorter intervals. The application of such a pulsed current to a jump lambda sensor is possible, as a rule, with the normal electrical wiring of a jump lambda sensor, so that the method according to the invention does not require any further hardware components and can make use of the electrical wiring present in any case.

Preferably, a low and/or a higher and/or a further increased frequency is selected as a function of the state of the sensor. The selection of the frequency of the pulsed current as a function of the state of the sensor, in particular as a function of the temperature of the sensor, has the advantage that the polarization effects induced in the sensor by the application of the current pulses can be taken into account. With a cold sensor in particular, the polarization effects are comparatively strong and of comparatively long duration, so that, with a cold sensor, the frequency of the current pulses is preferably selected low, so that summation of the polarization effects does not occur.

In a preferred configuration of the method according to the invention, the internal resistance of the sensor is measured with a low frequency of the pulsed current after the internal combustion engine has been started. The low frequency of the applied current pulses has the effect that the polarization induced can decay before a further pulse reaches the sensor. This has the advantage that a build-up of the polarizations induced does not occur in the sensor. The measurement values obtained in this way are checked to determine whether operational readiness of the sensor is imminent, that is, whether the temperature required for operational readiness of the sensor has almost been reached. As soon as the measured internal resistance permits this inference, measurement of the internal resistance is carried out with a higher frequency of the current pulses. In this state of the sensor, the temperature of the ceramic is already so high that the polarizations induced by the current pulses do not have a strong effect. The sensor signal is therefore not unnecessarily distorted thereby. Through the higher measurement frequency, changes of the sensor are detected very quickly, so that undershooting of a predefinable threshold value of the internal resistance is detected without delay. As soon as the predefinable threshold is undershot, therefore, it can be concluded that operational readiness of the sensor has been reached. This adaptation according to the invention of the frequency of the internal resistance measurement or of the applied pulsed current for measuring the internal resistance has the advantage that the polarization effects of the sensor induced with a comparatively cold sensor are restricted to a minimum. Through the increase in frequency once the sensor temperature has risen, the increase in the sensor temperature is detected practically without delay. In this state of the sensor the polarization effects are significantly weaker and do not lead to critical distortion or disturbance of the signal, so that in this state of the sensor the relatively high frequency of the current pulses is not disadvantageous.

In an especially preferred configuration of the method according to the invention, the first internal resistance measurement takes place only if one or more measurement values and/or modulated values indicate that the sensor has reached a particular minimum temperature. As soon as a predefinable minimum temperature of the sensor can be inferred, the internal resistance is measured first with a low frequency of the pulsed current. Because the minimum temperature of the sensor has already been reached, the polarizations of the sensor induced by the applied current pulses are not very strong or long-lasting, so that the sensor signal is not distorted unnecessarily strongly thereby.

In an especially preferred manner, a plausibility check of the inference that operational readiness of the sensor has been reached may be carried out by further increasing the frequency of the current pulses for internal resistance measurement after it has been inferred for the first time that operational readiness has been reached, and the internal resistance values obtained in this way are used for inferring the sensor temperature reached. In this way the detection of operational readiness can be confirmed very rapidly and without relevant delay.

After it has been inferred that operational readiness of the sensor has been reached, the internal resistance can from now on be measured with a low frequency. This is in general sufficient to detect further changes in the state of the sensor, especially with regard to the sensor temperature. In this case the low measuring frequency ensures that the influence of the applied current pulses on the sensor signal, in particular the polarizations induced thereby, is/are kept as small as possible. In particular, as a result of the low frequency superposition of the polarizations does not occur, the polarization effects being small in any case at this state of the sensor, and at the temperature reached by the sensor.

The selection of the particular frequencies of the pulsed current for the internal resistance measurement, in particular of the low frequency, the higher frequency and the further increased frequency, depends on the particular configuration and geometry of the respective jump sensor. For example, with a usual jump sensor the low frequency may be from approximately 0.5 to approximately 5 Hz, preferably from approximately 1 to approximately 3 Hz. A low frequency of 2 Hz is especially preferred. The higher frequency may lie, for example, between approximately 5.5 and approximately 15 Hz, preferably between approximately 8 and approximately 12 Hz. 10 Hz is especially preferred. The further increased frequency may lie between approximately 15.5 and approximately 25 Hz, preferably between approximately 18 and approximately 22 Hz. 20 Hz is especially preferred. Depending on the configuration of the particular sensor, the frequencies may vary.

As has been described, in a preferred configuration of the method according to the invention a check of one or more measurement values and/or modeled values is carried out prior to the actual activation of the internal resistance measurement, in order to determine whether a predefinable minimum temperature of the sensor has been reached. These values may be absolute values, gradients and/or integrals of exhaust gas parameters, for example exhaust gas temperature and/or exhaust gas mass flows, or of sensor parameters such as the sensor voltage. From these values, which are often available in a control device of the internal combustion engine, a first conclusion regarding the temperature of the sensor can be drawn. It is thereby ensured that the following internal resistance measurement does not lead to unnecessarily strong polarization effects of the sensor, which in general occur only with a cold sensor. As soon as these measurement values or modeled values allow the inference that the sensor has already reached a minimum temperature, for example approximately 600° C., the polarization effects through internal resistance measurement are no longer so strong, so that the sensor signal is not unnecessarily disturbed thereby. In this first phase an internal resistance measurement performed with a very low frequency of current pulses, for example 1 Hz, may also, for example, be carried out. As a result of this very low frequency the polarization effect on the sensor is, on the one hand, acceptable and, on the other, the temperature of the sensor can be determined in a very simple manner on the basis of this internal resistance measurement.

For the inference regarding attainment of operational readiness of the sensor, it is preferably checked whether the measured internal resistance falls below a predefinable threshold. Because the internal resistance of the sensor is directly related to the sensor temperature or to the ceramic temperature of the sensor, the sensor temperature can be inferred from the measured internal resistance value, for example with reference to an appropriate characteristic curve, which sensor temperature is in turn directly related to the operational readiness of the sensor. Preferably, attainment of operational readiness is inferred only if the predefinable threshold has been undershot in a plurality of measurements, in particular in a plurality of successive measurements. The robustness of the method according to the invention is thereby further increased, since a single measurement error does not lead to a false inference regarding the operational readiness of the sensor. In an especially preferred embodiment, the frequency of the current pulses for the internal resistance measurement is increased after the predefinable threshold has been undershot for a first time. The speed of detection of operational readiness can thereby be further increased, since measurement results are generated in more rapid succession, so that the operational readiness of the lambda sensor can be detected and checked for plausibility practically without delay.

To sum up, with the measurement of internal resistance the method according to the invention makes use of a criterion for operational readiness of the sensor which correlates directly with the temperature of the sensor element. This criterion is checked with reference to a rapid succession of measurements in order to detect the operational readiness of the sensor. No retarding additional criteria or complex plausibility checks are required, so that the method according to the invention can detect the operational readiness of the sensor very rapidly and reliably. A particular advantage of the method according to the invention is that the detection of operational readiness of the sensor is independent of the composition of the exhaust gas. With conventional methods for detecting operational readiness which, for example, evaluate the sensor voltage in relation to a reverse voltage, a delay in detecting operational readiness can occur if the exhaust gas lambda changes. This is precluded with the method according to the invention, since the criterion for the method according to the invention is only the temperature of the sensor ceramic or the internal resistance of the sensor correlating therewith, which is independent of exhaust gas composition. With the method according to the invention, therefore, no delays occur in detecting operational readiness if the exhaust gas composition fluctuates. Furthermore, with the method according to the invention, sensor faults cannot be misinterpreted as operational readiness of the sensor, as is possible with methods known from the prior art.

The method according to the invention makes use of the very reliable criterion of the internal resistance of the sensor as a measure for sensor temperature and therefore for operational readiness of the sensor, the polarization effects in the sensor caused by the internal resistance measurement being minimized according to the invention by adapting the frequency of the applied current pulses for measuring internal resistance to the state of the sensor. The method according to the invention therefore permits substantially faster and more reliable detection of operational readiness of the sensor in comparison to conventional methods, without the sensor signal being negatively influenced or falsified. This in turn allows the lambda control to be activated at an earliest possible time. This results in lower emissions, since the phase between engine start and activation of the lambda control can be kept as short as possible, emissions being disproportionately high especially in this phase.

The invention further comprises a computer program which executes all the steps of the method according to the invention if it is run on a computer or a control device. Finally, the invention comprises a computer program product with program code which is stored on a machine-readable carrier so that the method according to the invention is carried out when the program is run on a computer or a control device. The control device may be, for example, the central control unit of a motor vehicle or of an internal combustion engine. The embodiment of the invention as a computer program or a computer program product has the special advantage that no further components have to be installed in the motor vehicle in order to utilize the method according to the invention. The method according to the invention for detecting operational readiness of a jump lambda sensor can make use of the usual wiring of a jump lambda sensor, so that no further components have to be installed. All that is required is, for example, to implement the appropriate computer program, so that the method according to the invention can also be utilized especially advantageously with existing motor vehicles.

Further advantages and features of the invention are apparent from the following description of exemplary embodiments in conjunction with the drawing. However, the individual features may in each case be implemented in isolation or in combination with one another.

BRIEF DESCRIPTION OF THE DRAWING

In the drawing:
FIG. 1 shows a schematic time progression of the detection of operational readiness according to the method according to the invention.

DETAILED DESCRIPTION

The method according to the invention utilizes the internal resistance of a jump lambda sensor as the criterion for detecting attainment of operational readiness of the sensor. A single-valued relationship exists between the sensor internal resistance and the sensor element temperature, the sensor element temperature exceeding a given temperature threshold when the sensor internal resistance simultaneously falls below a corresponding resistance threshold. Operational readiness of the sensor is reached when the internal resistance of the sensor has fallen below a given threshold. According to the invention, the internal resistance of the sensor is already measured before the sensor is operationally ready. Only by measuring prior to operational readiness of the sensor can attainment of operational readiness of the sensor be detected without delay. The sensor internal resistance is measured by applying a pulsed current to the sensor. According to the invention, in order to avoid negative effects of the internal resistance measurement in the form of polarization of the sensor the frequency of the applied current pulses is selected as a function of the state of the sensor. In this case, the frequency is preferably selected, and the internal resistance measurement is activated, in such a way that the sensor signal is influenced as little as possible. The adaptation of the frequency of the pulsed current allows the internal resistance to be measured as soon as the engine is started, in which case the pulsed current is applied with a low or very low frequency. In this case, variation of the frequency of the current pulses may be effected in that the pulse duration is kept constant in each case and the intervals between the pulses are changed. For example, the pulse duration may be 3 ms and the time interval between the start of each pulse may be 600 ms. By shortening the durations between the starts of the individual pulses, for example, the frequency is increased.

Especially preferably, the internal resistance may be measured only after the expiry of a certain or predefinable time; that is to say that prior to the expiry of this time the frequency of the current pulses is 0. After this certain time has expired, it can be assumed that the sensor is already hot enough for the polarization influence to be negligible.

Especially advantageously, the internal resistance measurement is started, that is, the frequency of the current pulses is set from 0 to greater than 0, only if one or more measurement values or modulated values indicate that the sensor is hot enough for the polarization influence to be negligible. As a criterion for this, absolute values, gradients or integrals of exhaust gas parameters or sensor parameters, for example, may serve. As soon as a minimum temperature of the sensor can be inferred with reference to these values, the internal resistance measurement is activated and carried out. For example, for this purpose a frequency of the current pulses of 2 Hz may be applied. The internal resistance values measurable thereby are checked to determine whether a predefinable threshold has been undershot, so that operational readiness of the sensor can then be inferred. Especially advantageously, the measuring frequency is increased, for example to 10 Hz, shortly before operational readiness is reached. The speed of the method for detecting operational readiness can thereby be substantially increased, so that operational readiness, once attained, can be detected substantially more quickly. After operational readiness has been detected, it is generally sufficient to measure the internal resistance with a lower frequency, for example of 2 Hz.

In an especially preferred embodiment, measurement is carried out with a low frequency, for example of 1 Hz, until a criterion indicating that attainment of operational readiness of the sensor is imminent has been reached. The influence of polarization on the sensor is thereby kept low. As soon as it can be assumed that operational readiness will be reached shortly, the frequency of the internal resistance measurement is increased, for example to 10 Hz. In this decisive phase, therefore, the generation of measurement values is accelerated so that operational readiness, once attained, can be detected practically without delay. Once operational readiness can be determined, measurement can again be effected with a lower frequency, for example of 2 Hz.

Especially preferably, the frequency can be increased again, for example to 20 Hz, after the criterion for operational readiness of the sensor has first been reached, that is, after the internal resistance has fallen below a predefinable threshold. With this procedure, a plausibility check of the operational readiness detected can be undertaken in a very short time. After the plausibility check, the sensor is evaluated as operationally ready. Measurement can then continue with a lower frequency, for example of 2 Hz.

Through this activation and frequency of internal resistance measurement adapted to the particular type of sensor, the influence on the sensor voltage can be minimized. In particular, the polarization effect on the sensor which accompanies internal resistance measurement is kept as small as possible. In this case the method according to the invention on the one hand uses the reliability of internal resistance measurement of the sensor as the criterion for operational readiness, or for the temperature of the sensor. On the other hand, the sensor signal is influenced and distorted as little as possible by the internal resistance measurement.

The robustness of the detection of operational readiness can be optimized especially advantageously if the sensor is evaluated as operationally ready not on the basis of a single measurement at which the measured internal resistance falls below the predefinable threshold, but only when the internal resistance has in each case fallen below the threshold in a plurality of successive measurements. To shorten the time needed for the plausibility checking in the form of a plurality of successive measurements, it is especially advantageously provided that the frequency of the internal resistance measurement is increased as soon as the first measurement values falls below the threshold.

The implementation of the method according to the invention is explained in an exemplary manner below with reference to the schematic progression of the detection of operational readiness in a jump lambda sensor shown in FIG. 1. After the engine has been started (time point 1) the internal resistance measurement is activated with a low frequency of the current pulses, for example 1 Hz. When the internal resistance falls below 1 kOhm, the frequency is increased to 10 Hz (time point 2). When the internal resistance falls below the threshold of 1 kOhm, attainment of operational readiness of the sensor is imminent. By increasing the frequency, measurement values are generated in rapid succession, so that operational readiness can be detected very quickly. At this time point the sensor is already so hot that a polarization caused by the internal resistance measurement decays completely within 100 ms. When the internal resistance falls below 400 ohms, the frequency is increased to 20 Hz (time point 3). By increasing the measurement frequency at this time point, the measurement result can be checked for plausibility as quickly as possible. At this time point the sensor is already so hot that polarization decays completely within 50 ms. Operational readiness of the sensor is indicated when the internal resistance was in each case less than 400 ohms in, for example, three successive measurements (time point 4). The frequency of the internal resistance measurement can then be reduced, for example to 2 Hz. This is generally sufficient for diagnostic purposes and for regulating heating of the sensor.

The invention claimed is:

1. A method for detecting operational readiness of a jump lambda sensor associated with an internal combustion engine, characterized in that internal resistance of the jump lambda sensor is determined as the criterion for operational readiness of the jump lambda sensor, the internal resistance being measured by applying a pulsed current to the jump lambda sensor, wherein the frequency of the pulsed current is adapted as a function of the measured internal resistance of the jump lambda sensor, and wherein the attainment of operational readiness of the jump lambda sensor is inferred when the measured internal resistance falls below a predefined threshold.

2. The method according to claim 1, characterized in that a first frequency and/or a second frequency greater than the first frequency is selected as the frequency of the pulsed current.

3. The method according to claim 2, comprising the following process steps:
   after the internal combustion engine has been started the internal resistance is measured at the first frequency of the pulsed current and the internal resistance is checked with reference to a measurement value for whether an imminent operational readiness of the jump lambda sensor can be inferred,
   as soon as an imminent operational readiness of the jump lambda sensor can be inferred, the internal resistance is measured with the second frequency of the pulsed current.

4. The method according to claim 3, characterized in that, after the internal combustion engine has been started and prior to measurement of the internal resistance, one or more measurement values and/or modeled values is/are evaluated in order to determine whether a predefined minimum temperature of the jump lambda sensor has been reached, measurement of the internal resistance by applying the pulse current to the jump lambda sensor at the first frequency being started after the minimum temperature has been reached.

5. The method according to claim 4, characterized in that the one or more measurement values and/or modeled values is/are absolute values, gradients and/or integrals of exhaust gas parameters, the exhaust gas parameters including at least one from the group consisting of: temperatures, mass flows and sensor voltage.

6. The method according to claim 3, characterized in that, in order to check the plausibility of the operational readiness attained, a further internal resistance measurement is carried out by applying the pulsed current at a third frequency, the third frequency being greater than the second frequency.

7. The method according to claim 6, characterized in that the third frequency for the pulsed current is from approximately 15.5 Hz to approximately 25 Hz.

8. The method according to claim 3, characterized in that, after attainment of operational readiness has been inferred, the internal resistance is measured with a third frequency of the pulsed current, the third frequency being less than the second frequency.

9. The method according to claim 2, characterized in that the first frequency is from approximately 0.5 Hz to approximately 5 Hz.

10. The method according to claim 2, characterized in that the second frequency is from approximately 5.5 Hz to approximately 15 Hz.

11. The method according to claim 2, wherein in order to infer attainment of operational readiness of the jump lambda sensor, the internal resistance is checked to see whether said internal resistance falls below a predefined threshold for a plurality of measurements.

12. The method according to claim 11, characterized in that the plurality of measurements are successive measurements.

13. The method according to claim 11, characterized in that the frequency of the pulsed current is increased from the first frequency to the second frequency after the predefined threshold has been undershot for the first time.

14. The method according to claim 1, wherein the measured internal resistance corresponds to the temperature of the jump lambda sensor, and wherein the measured internal resistance decreases as the temperature of the jump lambda sensor increases.

15. A method for detecting operational readiness of a jump lambda sensor associated with an internal combustion engine by determining internal resistance of the jump lambda sensor as a criterion for operational readiness of the jump lambda sensor, comprising:
   measuring internal resistance by applying a pulsed current to the jump lambda sensor at a first frequency;
   when the measured internal resistance decreases to a measurement value indicating an imminent operational readiness for the jump lambda sensor, measuring the internal resistance by applying a pulsed current to the jump lambda sensor at a second frequency that is greater than the first frequency;
   when the measured internal resistance decreases to a predefined threshold indicating an attained operational readiness for the jump lambda sensor, measuring the internal resistance by applying a pulsed current to the jump lambda sensor at a third frequency that is greater than the second frequency.

16. The method according to claim 15, including
   after the measured internal resistance is less than the predefined threshold for a plurality of successive measurements, measuring internal resistance by applying a pulsed current to the jump lambda sensor at a fourth frequency that is less than the second frequency.

17. The method according to claim 15, wherein the first frequency is from approximately 0.5 to approximately 5 Hz, the second frequency is from approximately 8 Hz to approximately 12 Hz, and the third frequency is from approximately 18 Hz to approximately 22 Hz.

18. The method according to claim 15, wherein the measured internal resistance corresponds to temperature of the jump lambda sensor, and wherein the measured internal resistance decreases as the temperature of the jump lambda sensor increases.

* * * * *